United States Patent [19]

Heyden et al.

[11] 3,919,111

[45] Nov. 11, 1975

[54] AGENTS AND METHOD FOR FOAM CONTROL

[75] Inventors: Rudi Heyden, Hochdahl-Millrath; Michael Eckelt, Dusseldorf-Benrath, both of Germany

[73] Assignee: Henkel & Cie G.m.b.H., Dusseldorf, Germany

[22] Filed: Feb. 28, 1973

[21] Appl. No.: 336,601

[30] Foreign Application Priority Data

Feb. 29, 1972 Germany............................ 2209559

[52] U.S. Cl. ................ 252/321; 252/106; 252/358; 252/528; 260/17 R; 260/29.6 B; 260/29.6 R; 260/29.6 RB
[51] Int. Cl.²........................................ B01D 19/04
[58] Field of Search .......... 252/321, 358; 260/410.6

[56] References Cited
UNITED STATES PATENTS

| 2,346,928 | 4/1944 | Lighthipe | 252/321 X |
| 2,385,849 | 10/1945 | Snell et al. | 260/410.6 X |
| 2,575,276 | 11/1951 | Jacoby et al. | 252/321 |
| 2,575,298 | 11/1951 | Ryznar | 252/321 |
| 3,677,963 | 7/1972 | Lichtman et al. | 252/321 X |

*Primary Examiner*—Richard D. Lovering
*Attorney, Agent, or Firm*—Hammond & Littell

[57] ABSTRACT

Anti-foam compositions comprising a minor amount of a monoester or a diester of hydroxystearyl alcohol with a saturated fatty acid or hydroxyfatty acid having from 15 to 24 carbon atoms dispersed in an organic liquid or water, and the process of controlling foam by the incorporation of said anti-foam compositions in foamable liquids.

6 Claims, No Drawings

AGENTS AND METHOD FOR FOAM CONTROL

THE PRIOR ART

It is known in the prior art to use anti-foam compositions in the form of dispersions which contain the active substance or substances in finely divided form, dispersed in an organic liquid or in water, for the de-foaming of waste water, for foam control in the paper industry, in cellulose production, in the production of plastic dispersions and paint dispersions, in the practice of biological processes, and in the food industry. The finely divided de-foamer is, as a rule, a solid substance of waxy consistency. For example, pentaerythritol fatty acid esters, fatty acid monoglycerides, fatty acid polyglycol esters and the like are used according to U.S. Pat. No. 2,715,613.

OBJECTS OF THE INVENTION

An object of the present invention is the development of an improved anti-foaming composition of a waxy de-foamer dispersed in an organic liquid or water.

Another object of the present invention is the development of an anti-foaming composition containing a minor amount of an ester of hydroxystearyl alcohol selected from the group consisting of monoesters and diesters with an acid selected from the group consisting of saturated fatty acids having from 16 to 24 carbon atoms and saturated hydroxyfatty acids having from 16 to 24 carbon atoms, finely dispersed in a liquid selected from the group consisting of inert organic liquids, liquid in the range of from 5° to 140°C and water.

A further object of the present invention is the development of, in the process for the control of foam in foamable liquids comprising adding an effective amount of a waxy de-foamer dispersion in an organic liquid or water, the improvement consisting of utilizing, as said waxy de-foamer, a finely dispersed ester of hydroxystearyl alcohol selected from the group consisting of monoesters and diesters with an acid selected from the group consisting of saturated fatty acids having from 16 to 24 carbon atoms and saturated hydroxyfatty acids having from 16 to 24 carbon atoms.

These and other objects of the present invention will become more apparent as the description thereof proceeds.

DESCRIPTION OF THE INVENTION

This invention relates to foam control compositions in dispersed form based on a waxy de-foamer dispersed in an organic liquid or in water, characterized in that the waxy de-foamer is a mono- and/or di-ester of hydroxystearyl alcohol with a saturated fatty acid or hydroxyfatty acid with more than 16 carbon atoms up to 24 carbon atoms, preferably with 18 to 22 carbon atoms.

The claimed esters are waxy substances with relatively well defined melting points. These are about 70° to 80°C, depending on the purity of the substance and the chain length of the fatty acids used for esterification. For example, the industrially produced monobehenic acid ester of hydroxystearyl alcohol has a melting point of about 72.5° to 74°C, the corresponding diester one of about 72° to 76°C.

The production of the esters occurs in known manner, for example, by esterification of hydroxystearyl alcohol with the respective fatty acid or hydroxyfatty acid or by transesterification with the corresponding methyl esters in the desired molar ratio. The monobehenic acid ester or the monohydroxystearic acid or hydroxystearyl alcohol have proved to be particularly suitable in the sense of the invention, but often also the corresponding diesters of hydroxystearyl alcohol are very suitable.

Hydroxystearyl alcohol consists predominately of an octadecane-1,12-diol with one primary and one secondary hydroxyl group, which is produced by hydrogenization of ricinoleic acid.

The esters are used in the form of a finely divided dispersion in an organic or aqueous liquid. Suitable as liquid phase, besides water, are, above all, organic substances which are liquid at normal temperatures of from 5° to 140°C, and have a sufficiently low pour point or a melting point of less than 5°C. A relatively high viscosity is also advantageous as it contributes to the stabilization of the dispersions. The liquid phase may itself have a de-foaming effect or simply serve as a vehicle for the de-foamer.

As suitable organic liquids under consideration are, above all, mineral oils having a boiling point of over 140°C, esters of highly branched or unsaturated fatty acids having 8 to 18 carbon atoms with monohydric or polyhydric alcohols, e.g., ethylene glycol diesters or glycerine triesters of oleic acid, oleyl oleate, etc., also branched-chain or unsaturated liquid fatty acids or fatty alcohols having 8 to 18 carbon atoms, e.g., isotridecyl alcohol or oleyl alcohol, further terpene hydrocarbons, such as pine oil, turpentine and the like.

It is advantageous to use organic substances which, when heated, have a sufficient dissolving power to dissolve the esters and to separate them out again in finely divided form upon cooling. This permits a convenient production of the de-foamer dispersions by joint heating of the components and subsequent rapid cooling under intensive mixing. Extremely finely divided and stable dispersions are thus obtained. Alternatively, it is possible to produce the dispersion by stirring the finely ground ester into the liquid phase. The dispersions preferably contain about 5 to 15% by weight of hydroxystearyl alcohol ester, although other amounts may be used.

The de-foamer dispersions of the invention exhibit an excellent de-foaming power and can be used with surprisingly good results in a plurality of industrial processes, as well as in cases where the foam control normally presents great difficulties. For use in especially difficult or specific applications, however, it may be advantageous to add to the dispersions other known de-foaming substances, for example, silicone oils, fats, waxes, fatty acids, adducts of ethylene oxide and/or propylene oxide to fatty alcohols, alkylphenols or fatty acids and the like. The de-foaming effect that can be achieved with such combinations is often greater than the effect attainable with the individual components. Especially successful have proved to be combinations which contain 60 to 80 parts by weight hydroxystearyl monobehenate or of another hydroxystearyl alcohol ester with 40 to 20 parts by weight of the adduct of 2 mols of ethylene oxide and 4 mols of propylene oxide to isotridecyl alcohol or of a polyethyleneglycol stearic acid ester of a molar weight of 5000 to 10,000, dispersed in an organic liquid or in water, where the total amount of de-foamers is from 5 to 15% by weight in the de-foamer dispersion composition.

Depending on the area of application, or to increase the stability or effectiveness, the de-foamer dispersions may contain further additives and aids, as for example, thickeners, such as aluminum, calcium or zinc stearate, of finely divided silicic acid. The quantities of these additive components are generally between 0.1 and 5% by weight, referred to the de-foamer dispersion.

The de-foamers may be added directly to the liquids tending to foam, such as, for example, plastic dispersions of the type of polyacrylate dispersions, polystyrene/butadiene dispersions, or polyvinyl acetate dispersions. Accordingly they can be incorporated directly also in wallpaper brush-on paints or dispersion paints for coating purposes. Another possibility of application consists in adding the de-foamers at the site of foam formation, for instance in paper and cellulose production or in the de-foaming of waste water. In this case, the foam control takes place by dropping or spraying the de-foamer on or in the zone of operation of agitators or pumps, at overflows and the like. In like manner the de-foamers can be used also in the food industry, as for example in the production of sugar and yeast, in fermentation processes, etc., for the control of disturbing foams. The quantities used depend on the kind and foaming tendency of the respective substrate. Accordingly, the proportion is adapted to the effect to be obtained, especially when applying by dropping or spraying. For addition to foaming solutions or incorporation in pigment, dye, or plastic dispersions and the like, de-foamer dispersion quantities of about 0.5 to 10 g/liter are needed. The amount of active material esters of hydroxystearyl alcohols thus applied is in the order of from 0.005 gm to 1 gm per liter of foaming liquid.

The following specific embodiments are illustrative of the invention without being limitative in any respect.

EXAMPLE 1

Production of a Defoamer Dispersion a. 895 parts by weight of a mineral oil ($D_{15°}$ = 0.889, $\eta_{20°}$ = 1.60 cSt, pour point at −49°C) were heated to 90°C in an open heatable mixer with a high-speed agitator. At this temperature, 70 parts by weight of hydroxystearyl monobehenate and 30 parts by weight of an adduct of isotridecyl alcohol with 2 mols of ethylene oxide and 4 mols of propylene oxide, as well as 5 parts by weight of calcium stearate were stirred in. After all the additions were clearly dissolved, the product was stirred rapidly until it was cold.

As comparative examples, known fatty acid esters were used as anti-foamants for comparison by replacing the hydroxystearyl monobehenate with the same amount of:

b. Pentaerythritol monostearate
c. Glycerine monostearate
d. Pentaerythritol monobehenate
e. Glycerine tristearate.

All of the defoamers produced according to (a) to (e) were thin, turbid dispersions stable in storage.

Defoaming Effect

Using a plasticizer-free finely dispersed polyvinyl acetate dispersion, a paint dispersion (stock batch) for indoor and outdoor painting was produced according to the following formulations. 0.2% of the defoamers according to Examples 1a to 1e were utilized as the anti-foamant.

| Components | Indoor Paint Parts by Wt. | Outdoor Paint Parts by Wt. |
|---|---|---|
| Water | 26.0 | 53.0 |
| Na hexametaphosphate (10% solution) | 12.0 | 12.0 |
| Pigment distributor (commercial product of BASF) | 1.0 | 1.0 |
| Anti-foamant according to Examples 1a to 1e | 2.0 | 2.0 |
| Ethylene glycol | 10.0 | 20.0 |
| Balsam turpentine | 20.0 | 20.0 |
| Titanium dioxide Anatas | 60.0 | — |
| Titanium dioxide Rutile | — | 160.0 |
| Crystalline calcium carbonate (finely ground) | 300.0 | — |
| Quartz flour (finely divided) | 180.0 | — |
| Calcium carbonate (finely divided) | — | 202.0 |
| Talc | — | 50.0 |
| Methyl cellulose (2% solution) | 210.0 | — |
| Hydroxyethyl cellulose (2% solution) | — | 150.0 |

The listed components were dispersed and then mixed with

| | | |
|---|---|---|
| Polyvinyl acetate dispersion | 175.0 | 326.0 |
| Mercury phenyl acetate (1:9 in water) | 4.0 | 4.0 |

The pH was adjusted to 7.0–8.5 with undiluted NaOH.

The testing of the anti-foam effect of the added de-foamer dispersions was practiced on the dissolver.

Immediately after the production of the paint dispersion (stock batch), 80 parts by weight of paint were mixed with 20 parts by weight of water, stirring for 1 minute at 2000 rpm with a dissolver (dispersing disk dia. 40mm). Then immediately 50 ml of the product were weighed. The higher the weight of the sample, the lower is the air content, and hence the better the effect of the defoamer.

| Addition According to Example | Indoor Paint Wt. in Gms. | Outdoor Paint Wt. in Grams |
|---|---|---|
| 1a | 68.0 | 61.5 |
| 1b | 62.5 | 57.0 |
| 1c | 60.9 | 58.8 |
| 1d | 63.0 | 57.9 |
| 1e | 62.3 | 56.0 |
| Without defoamer addition | 42.5 | 38.5 |
| Not stirred, carefully deaerated | 70.0 | 65.0 |

EXAMPLE 2

Production of Defoamer Dispersion a. 820 parts by weight of isotridecyl alcohol were heated to about 90°C in an agitator vessel with high speed agitator. At this temperature there were charged in consecutive portions, 70.0 parts by weight of hydroxystearyl monobehenate as well as 30.0 parts by weight of the adduct of isotridecyl alcohol with 2 mols of ethylene oxide and 4 mols of propylene oxide. Also there were added to the batch 10.0 parts by weight of aluminum stearate, 20.0 parts by weight of very finely divided silicic acid and 40.0 parts by weight of silicone oil of the methylpolysiloxane type.

After all substances had become dissolved or very finely divided during continuous mixing, the temperature was reduced to normal while mixing. A homogenous, viscous dispersion was obtained, which remained stable also upon prolonged storage.

Similar comparative dispersions were obtained when replacing the hydroxystearyl monobehenate with the same amount of known fatty acid esters as anti-foamants:
  b. Pentaerythritol monostearate
  c. Glycerine monostearate
  d. Pentaerythritol monobehenate
  e. Glycerine mono-oleate.

Defoaming Effect

Using a styrene-butadiene plastic dispersion, a paint dispersion for indoor painting was produced with a defoamer addition of 0.19% according to Examples 2a to 2e.

| Component | Parts by Weight |
| --- | --- |
| Water | 207.5 |
| Na hexametaphosphate | 1.9 |
| Pigment distributor (commercial product of BASF) | 1.0 |
| Ammonia, conc. | 1.0 |
| Mercury phenol acetate | 0.5 |
| Titanium dioxide (Rutile) | 58.3 |
| Calcium carbonate, finely ground | 320.0 |
| Kaolin Dinkie | 135.5 |
| Methylhydroxypropyl cellulose (5 gm in 140 gm water) | 146.4 |
| Mineral spirits | 9.7 |
| Anti-foamant according to Examples 2a to 2e | 1.9 |
| Polystyrene/butadiene dispersion | 116.3 |

After stirring in the dissolver as in Example 1, 50 ml of the paints produced with addition of defoamers according to Example 2, had the following weights:

| Example | Grams |
| --- | --- |
| 2a | 54.0 |
| 2b | 52.0 |
| 2c | 47.9 |
| 2d | 52.1 |
| 2e | 43.4 |
| Without defoamer addition | 43.2 |
| Not stirred, carefully deaerated | 58.6 |

EXAMPLE 3

Production of Defoamer Dispersion a. 895 parts by weight of a mineral oil ($D_{15°} = 0.901$, $\eta_{20°} = 32$ cSt, pour point $= -15°C$) were heated to about 90°C in a mixer with high speed agitator. Into the heated oil, 70.0 parts by weight of hydroxystearyl monostearate, 30.0 parts by weight of polyethylene glycol having a molecular weight of 9000, esterified with stearic acid, and 5.0 parts by weight of aluminum stearate were mixed until a homogeneous solution was formed. Then the temperature was cooled to normal.

b. In the same manner, a defoamer dispersion was produced using 70 parts by weight of hydroxystearyl distearate in place of the hydroxystearyl monostearate.

In further examples, the following fatty acid esters known as anti-foamants were substituted for the hydroxystearyl monostearate:
  c. Pentaerythritol monostearate
  d. Glycerine monostearate
  e. Pentaerythritol monobehenate
  f. Glycerine mono-oleate.

All defoamers obtained according to Examples 3a to 3f were thin, turbid products stable in storage.

Defoaming Effect:

Using a polystyrene/acrylate dispersion, a paint dispersion with 0.2% anti-foamant addition was produced. The constituents listed below are mixed in the stated order in a dissolver:

| Components | Parts by Weight |
| --- | --- |
| Water | 171.2 |
| Sodium tripolyphosphate, 30% solution | 2.1 |
| Pigment distributor (commercial product of BASF) | 0.7 |
| Titanium dioxide | 150.0 |
| Methyl cellulose | 5.0 |
| Ammonia, conc. | 2.0 |
| Heavy spar | 218.0 |
| Mercury phenyl acetate (diluted 1:9) | 3.0 |
| Heavy benzine | 18.0 |
| Anti-foamant according to Examples 3a to 3f | 2.0 |
| Polystyrene/acrylate dispersion | 420.0 |
| Butyl diglycol | 8.0 |

The anti-foamant is appropriately added in several separate portions.

After mixing in the dissolver, according to Example 1, the following values per 50 ml of paint were obtained:

| Example | Grams |
| --- | --- |
| 3a | 52.4 |
| 3b | 51.2 |
| 3c | 47.2 |
| 3d | 40.5 |
| 3e | 49.2 |
| 3f | 48.2 |
| Without defoamer addition | 40.0 |
| Not stirred, carefully deaerated | 65.0 |

Instead of the hydroxystearyl stearic acid esters (Examples 3a to 3b), the corresponding behenic acid and montanic acid esters may be used with equally good results.

EXAMPLE 4

The effect of defoamers on foaming aqueous solutions can be tested by filling a 2-liter graduated cylinder with 500 ml of the liquid to be tested. The solution is pumped from the bottom of the graduated cylinder by means of a laboratory hose pump with a glass tube. The return of the liquid occurs via a second tube, whose lower end terminates at the level of the upper edge of the graduated cylinder. The liquid is pumped over at a rate of 4 liters/min. and falls back into the measured cylinder.

A constant foam level establishes itself depending on the composition of the liquid to be tested.

a. For the testing of defoamers as used in paper making, there were charged, per 500 ml of operating water at 16° dH (German hardness), 10 ml of a 1% gelatin solution and 10 ml of a 2.5% resin size solution. This mixture was adjusted to a pH of 4.5 with aluminum sulfate solution.

After a short running time, a constant foam level of about 2000 ml established itself in the above-described testing apparatus. Now 0.1 ml defoamer was placed on the foam column from a micro-pipette and the upper edge of the foam column (i.e., foam level including liquid column) was read, after 0.5, 1, 2, 3, 4, 5 and 10 minutes while continuing the circulation of the liquid.

Defoamers common in the paper industry were tested in comparison with the defoamer of the invention according to Example 1a.

| Defoamer | 0 | 0.5 | 1 | 2 | 3 | 4 | 5 | 10 min. |
|---|---|---|---|---|---|---|---|---|
| Oleic acid + 3 mols of ethylene oxide | 2000 | 2000 | 1950 | 1800 | 1750 | 1700 | 1650 | 1500 ml |
| Rape oil fatty acid + 6 mols of ethylene oxide, mineral oil (1:1) | 2000 | 1950 | 1950 | 1950 | 1950 | 1950 | 1950 | 2000 ml |
| De-foamer according to example 1 a | 2000 | 700 | 650 | 740 | 800 | 1000 | 1400 | 1500 ml | b. For the testing of defoamers as needed for the production of baking yeast, a 20% molasses solution was brought to foaming in the described apparatus. For defoaming, 0.05% of de-foamer was added.

| De-foamer according to Example | 0 | 0.5 | 1 | 2 | 3 | 4 | 5 | 10 min. |
|---|---|---|---|---|---|---|---|---|
| 1 a) | 1400 | 350 | 400 | 400 | 420 | 440 | 460 | 540 ml |
| 1 c) | 1400 | 600 | 640 | 680 | 750 | 800 | 850 | 950 ml |

In both cases the de-foamers according to the invention (Example 1a) showed a superior effect.

EXAMPLE 5

The effect of the anti-foamants on plastic dispersions was tested as follows:

100 ml of a commercial dispersion were diluted with the same quantity of distilled water and mixed in a screw-cover bottle of a capacity of 1 liter with vane agitator for 1 minute at 2000 rpm. The foam level was measured as distance of the liquid level from the upper foam limit in cm. This foam level was taken as 100.

Then the anti-foamant was added in drops from a pipette. By moderate shaking, the de-foamer was distributed uniformly. Three minutes after addition of the anit-foamant, the foam level was measured and stated in percent of the reduction of the original foam level (I.). Further, the time to complete foam collapse was determined in minutes (II).

Mixing was resumed for 1 minute at 2000 rpm and again the foam level was measured immediately (III) and after 3 minutes (IV) and stated in percent of the original foam level. Further, the time to complete collapse was determined (V).

a. On a commercial vinyl acetate dispersion, defoamers based on pentaerythritol monostearate (Example 1b) and glycerine monostearate (Example 3c) were compared with the de-foamer of the invention according to Example 3a).

| Example De-foamer addition: | 1 b) | | 3 c) | | 3 a) | |
|---|---|---|---|---|---|---|
| | 0.2% | 0.5% | 0.2% | 0.5% | 0.2% | 0.5% |
| I | 83.0 | 100.0 | 100.0 | 100.0 | 100.0 | 100.0 |
| II | 4.5 | 2.0 | 2.0 | 1.0 | 1.5 | 1.5 |
| III | 15.0 | 6.0 | 11.0 | 0 | 0 | 0 |
| IV | — | — | — | — | — | — |
| V | — | — | — | — | — | — | b. On a commercial plastic dispersion of the polystyrene/butadiene type, a silicone-containing commercial de-foamer was compared as above with the product of the invention according to Example 2a:

| Example: De-foamer addition | Commercial de-foamer 0.2% | 2 a) 0.2% |
|---|---|---|
| I | 76.0 | 100.0 |
| II | 6.0 | 3.0 |
| III | 29.0 | 12.0 |
| IV | 92.0 | 100.0 |
| V | 8.0 | 3.0 |

EXAMPLE 6

Alkaline salt mixtures which contain small quantities of surfactants and bactericidal or fungicidal substances are often used in the food industry for cleaning the equipment. As the solutions of these products are pumped through the apparatus at high speed, a foam control agent must be added to the mixtures.

In the testing apparatus described in Example 4, an 0.5% solution of the following salt mixture was caused to foam:

| | |
|---|---|
| Sodium polyphosphate | 35.0 |
| Waterglass | 25.0 |
| Sodium sulfate | 17.5 |
| Soda | 15.0 |
| Nonyl phenol + 10 EO | 5.0 |
| Lauryl-trimethyl-ammonium chloride | 0.5 |
| De-foamer | 2.0 |

The following table shows the foam levels resulting upon re-pumping the solution:

| De-foamer | Time in Minutes | | | | | | |
|---|---|---|---|---|---|---|---|
| | 1/2 | 1 | 2 | 3 | 4 | 5 | 10 |
| Without de-foamer | 800 | 960 | 1200 | 1360 | 1740 | 1980 | +) |
| Anti-foamant of Example 3 a | 500 | 500 | 500 | 500 | 500 | 500 | 500 |
| Anti-foamant of Example 3 b | 500 | 510 | 520 | 530 | 540 | 560 | 570 |

-continued

| De-foamer | Time in Minutes | | | | | | |
| --- | --- | --- | --- | --- | --- | --- | --- |
| | 1/2 | 1 | 2 | 3 | 4 | 5 | 10 |
| Anti-foamant of Example 3 d | 500 | 520 | 540 | 560 | 590 | 620 | 650 |
| Anti-foamant of Example 3 f | 720 | 820 | 940 | 1140 | 1460 | 1860 | +) |

+)Foam level not determinable

The table shows that the products 3a and 3b of the invention are clearly superior to the known products 3d and 3f.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. Anti-foaming composition consisting essentially of from 5 to 15% by weight of said composition of an ester of hydroxystearyl alcohol selected from the group consisting of monoesters and diesters with an acid selected from the group consisting of saturated fatty acids having from 16 to 24 carbon atoms and saturated hydroxy fatty acids having from 16 to 24 carbon atoms, and optionally having a further content of another active de-foamer compound wherein the ratio of said ester of hydroxystearyl alcohol to said another active de-foamer compound if present is from 60:40 to 80:20 by weight, said another active de-foamer compound being selected from the group consisting of an adduct of 2 mols of ethylene oxide and 4 mols of propylene oxide to isotridecyl alcohol and a polyethylene glycol ester with stearic acid having a molecular weight of from 5000 to 10,000, finely dispersed in a liquid selected from the group consisting of inert organic liquids, liquid in the range of from 15° to 140°C and water, with the proviso that the total amount of de-foamers is from 5 to 15% by weight of said composition.

2. The composition of claim 1 wherein said fatty acids and hydroxyfatty acids have from 18 to 22 carbon atoms.

3. The composition of claim 1 wherein said acid is selected from the group consisting of behenic acid, hydroxystearic acid and montanic acid.

4. The composition of claim 1 wherein said liquid is selected from the group consisting of mineral oils having a boiling point of over 140°C, isotridecyl alcohol, and mixtures thereof.

5. The composition of claim 1 which has a further content of said another active de-foamer compound.

6. In the process for the control of foam in foamable liquids comprising adding an effective amount of a waxy de-foamer dispersion in an organic liquid or water, the improvement consisting of utilizing, as said waxy de-foamer, from 5 to 15% by weight of said dispersion of a finely dispersed ester of hydroxystearyl alcohol selected from the group consisting of monoesters and diesters with an acid selected from the group consisting of saturated fatty acids having from 16 to 24 carbon atoms and saturated hydroxy fatty acids having from 16 to 24 carbon atoms, and optionally having a further content of another active de-foamer compound wherein the ratio of said ester of hydroxystearyl alcohol to said another active de-foamer compound is from 60:40 to 80:20 by weight, said another active de-foamer compound being selected from the group consisting of an adduct of 2 mols of ethylene oxide and 4 mols of propylene oxide to isotridecyl alcohol and a polyethylene glycol ester with stearic acid having a molecular weight of from 5000 to 10,000, with the proviso that the total amount of defoamer is from 5 to 15% by weight of said dispersion.

* * * * *